Oct. 18, 1966  A. CLEMENTS  3,280,394
FOLLOW UP SYSTEM WITH SHUT HEIGHT INDICATOR
Filed Nov. 26, 1963  3 Sheets-Sheet 1

INVENTOR.
ALBERT CLEMENTS
BY Toulmin & Toulmin
ATTORNEYS

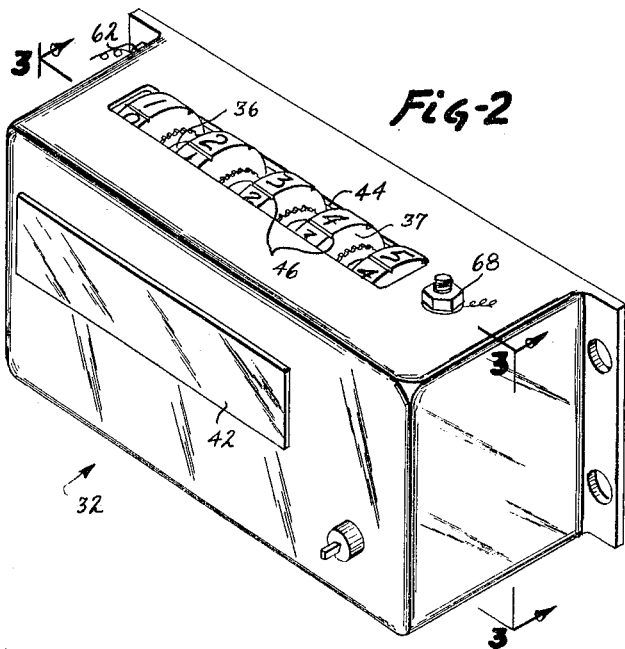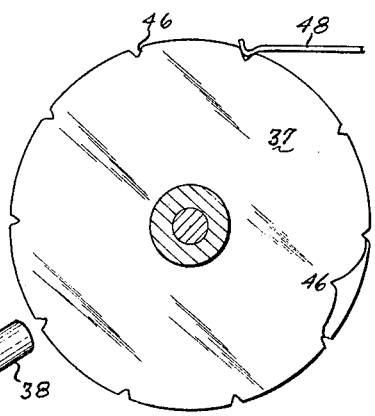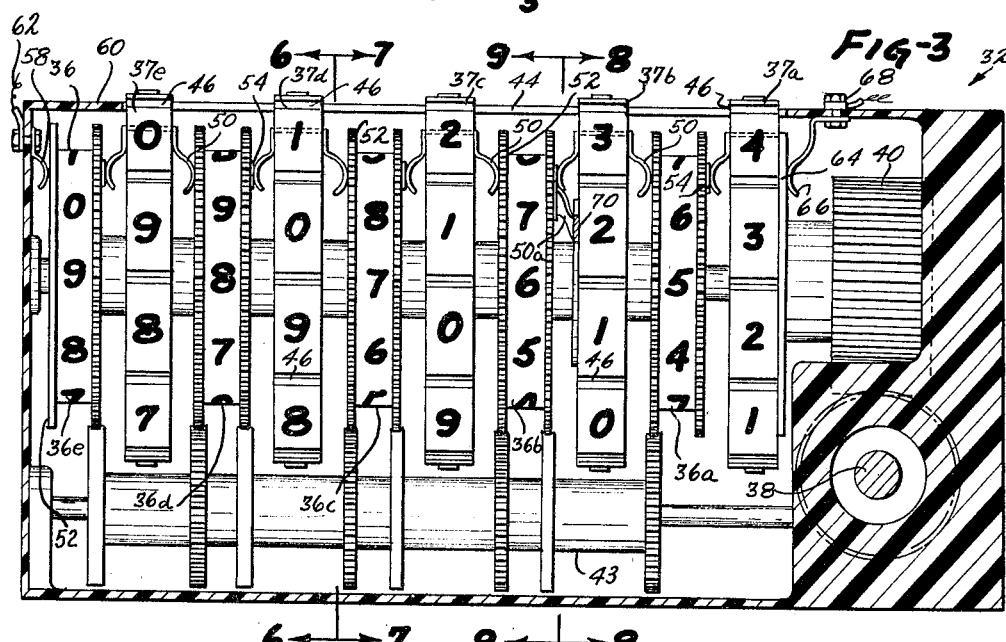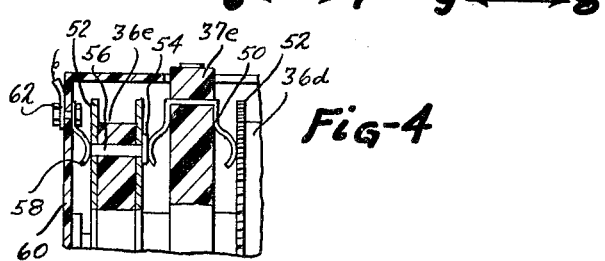

Oct. 18, 1966   A. CLEMENTS   3,280,394
FOLLOW UP SYSTEM WITH SHUT HEIGHT INDICATOR
Filed Nov. 26, 1963   3 Sheets-Sheet 3
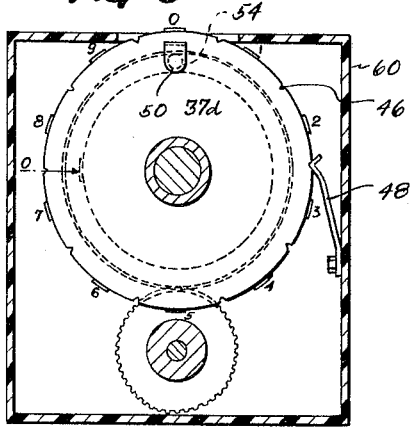
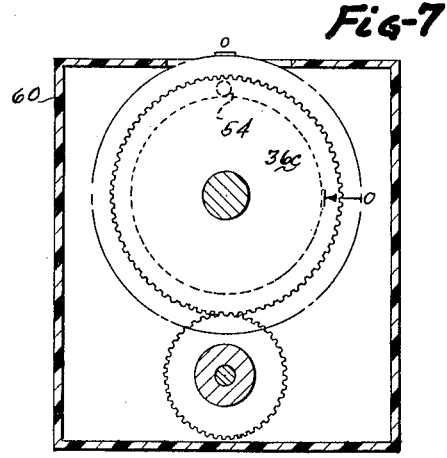
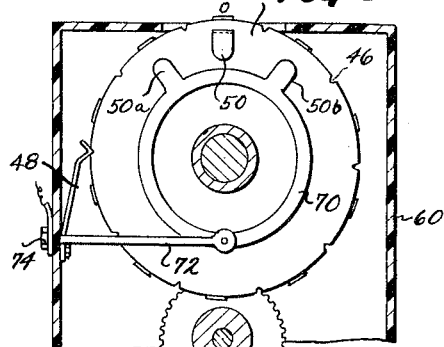
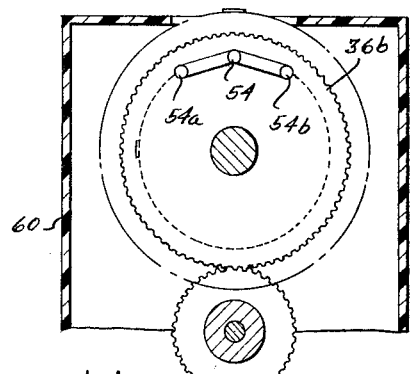
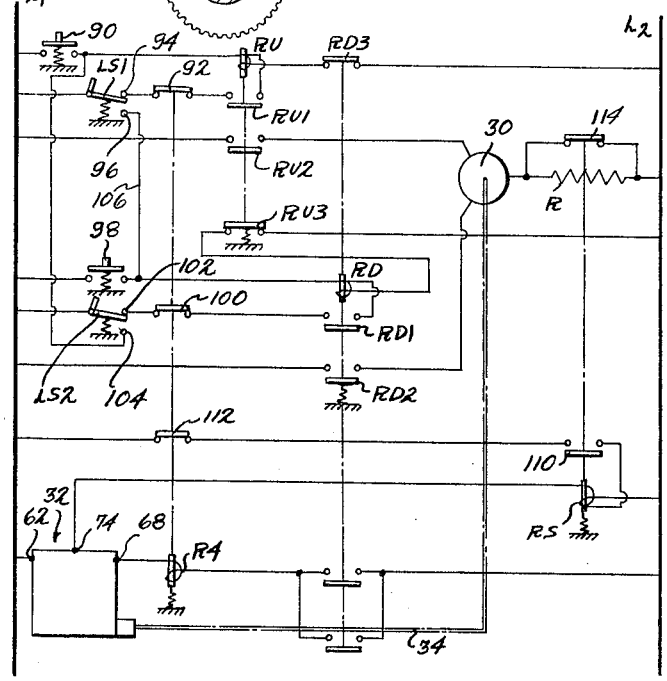
INVENTOR.
ALBERT CLEMENTS
BY Toulmin & Toulmin
ATTORNEYS United States Patent Office 3,280,394
Patented Oct. 18, 1966

3,280,394
FOLLOW UP SYSTEM WITH SHUT HEIGHT INDICATOR
Albert Clements, Hamilton, Ohio, assignor to Minster Machine Company, Minster, Ohio, a corporation of Ohio
Filed Nov. 26, 1963, Ser. No. 325,900
3 Claims. (Cl. 318—33)

This invention relates to an indicating device and to a control system pertaining thereto and is particularly concerned with an arrangement of this nature employed in connection with the adjustable slide of a mechanical press or the like for indicating the position of the slide with respect to the press bed.

Adjustable machine members are encountered many places in machine tools and one particular example of such a machine member is the slide of a mechanical press. The slide of a mechanical press is driven by a crankshaft which, of course, has a fixed throw. The slide of such a press will therefore always take the length of stroke.

The die sets and the like to be mounted in a mechanical press, however, will vary as to height and it is thus necessary either to adapt the die to the press daylight opening or to adapt the press daylight opening to the die. The latter expedient is the most convenient one and this is usually accomplished by adjusting the position of the slide relative to the crankshaft by adjusting the length of the connecting rod means leading from the crankshaft throw to the slide.

This can be done manually but it is much more convenient in most cases to employ a reversible motor actuating one of two screw threaded members in engagement with each other and one thereof forming a part of the connecting rod means and the other being carried by the slide and forming the means connecting the connecting rod means to the slide.

It is in particular connection with a press having a motorized slide adjustment of this nature that the present invention is concerned. In particular, the present invention is concerned with an arrangement which will indicate with a high degree of accuracy the adjustment of the slide relative to the crankshaft by which it is actuated.

This adjustment can be indicated, for example as the shut-height of the press which would represent the lowest position to be reached by the slide during reciprocation by the crankshaft.

Reference points other than the press bed could, of course, also be employed.

This invention also proposes the provision of an arrangement associated with the indicator for effecting an adjustment associated with the indicator for predetermining a shut-height or daylight opening of the press and which adjustment will then effect control of the slide adjusting motor so that the slide will move to the new predetermined shut-height or daylight opening and then come to a halt.

This arrangement greatly facilitates the adjusting of a press to receive a die set, reduces the possibility of damage to the new die set, and relieves expensive skilled labor for the task of manually adjusting the slide position.

With the foregoing in mind, it will be evident that a preliminary object of the invention is an indicator arrangement for indicating the shut-height or daylight opening of a mechanical press or the like having an adjustable member such as a press slide included in the combination.

Another object of this invention is the provision of an arrangement for pre-setting a desired shut-height or daylight opening and a control system whereby the slide will be automatically adjusted to the pre-selected shut-height or daylight opening.

A still further object of this invention is the provision of an arrangement described which will be relatively inexpensive to manufacture and install but which will be reliable and accurate in operation.

These and other objects and advantages of this invention will become more apparent upon reference to the following specification taken in connection with the accompanying drawings in which:

FIGURE 2 is a perspective view showing the indicator and adjustable device according to the present invention;

FIGURE 3 is a vertical section through the device indicated by lines 3—3 on FIGURES 1 and 2;

FIGURE 4 is a fragmentary view drawn at somewhat enlarged scale showing a detail in connection with the device of FIGURES 2 and 3;

FIGURE 5 is a fragmentary view showing another detail pertaining, in particular, to the adjustable dials of the device in FIGURES 2 and 3;

FIGURE 6 is a sectional view indicated by line 6—6 on FIGURE 3 showing the contact member carried by the manually adjustable dial;

FIGURE 7 is a section on line 7—7 of FIGURE 3 and is a companion view to FIGURE 6 and shows the construction and arrangement of the dial adjacent the aforementioned manually adjustable dial;

FIGURE 8 is a sectional view taken on line 8—8 of FIGURE 3 showing a contact arrangement useful for slowing down the slide adjusting motor as it approaches the position for which the adjustable indicator is adjusted;

FIGURE 9 is a sectional view indicated by line 9—9 on FIGURE 3 and is a companion view to FIGURE 8 and shows the contact arrangement cooperating with the contact arrangement referred to in connection with FIGURE 8; and, FIGURE 10 is a diagrammatic representation of a preferred control circuit arrangement employing the devices and contact devices above referred to.

Figure 1:
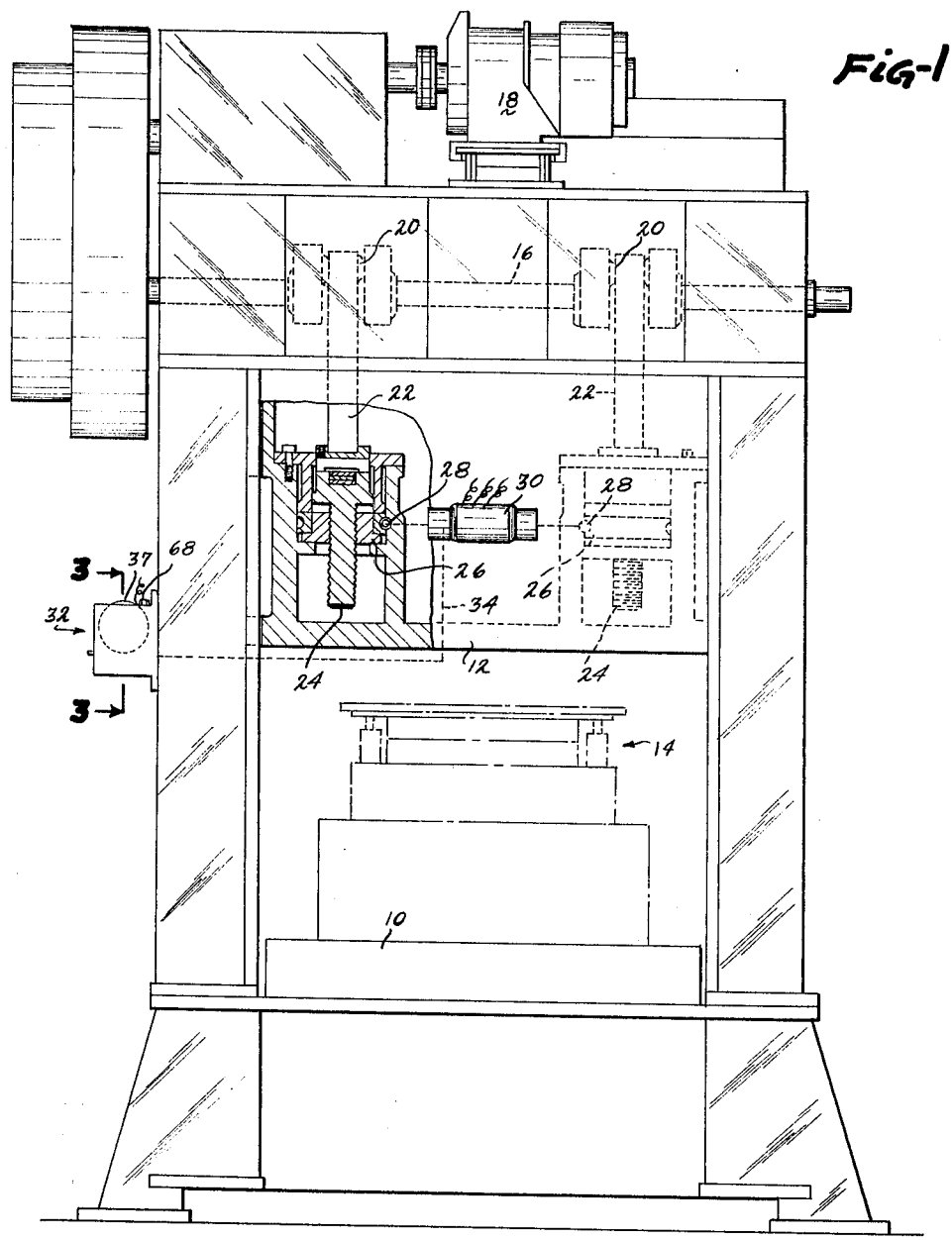
FIGURE 1 is a diagrammatic view showing a press structure and the manner in which the slide is adjusted relative to the crankshaft.

Referring to the drawings somewhat more in detail, the press which is schematically illustrated in FIGURE 1 consists of a press frame having a bed 10. Slidably mounted in the press frame is slide 12 and the space between bed 10 and slide 12 is the daylight opening of the press into which a die set such as is diagrammatically illustrated by the dot-dash outline 14 is to be mounted with one part being secured to the bed and another part being secured to slide 12.

In the head of the press is a crankshaft 16 driven in rotation by motor 18. The crankshaft includes one or more throws 20 and attached to each throw is a connection rod 22 leading to slide 12. The effective length of the connecting rod between throw 20 and the slide is adjustable according to the present invention so that the daylight opening of the press can be varied while slide 12 will always take one and the same motion with respect to total amount of travel.

One way of adjusting the effective length of connection rod 22 is to thread the rod at 24 and to mount on the rod a nut 26 which is rotatably mounted in the slide so that by turning the nut the effective length of the connecting rod can be lengthened or shortened. Turning of the nut can be accomplished by forming the nut as a gear or worm wheel and engaging the nut by a driving gear or worm 28 carried by the slide and which is drivingly connected with a reversible slide adjusting motor 30 which may, for example, be a geared head motor to provide for the desired speed of rotation of gear 28.

By way of example only, the total slide adjustment might amount to fourteen to eighteen inches and the speed of adjustment of the slide could advantageously be two inches per minute.

Where the crankshaft has two throw or crank pins thereon motor 30 may be double ended for adjustment of both connecting rods simultaneously so that the present invention is attached to presses having one or more than one connecting rod, joining the slide with the crankshaft.

According to the present invention an indicator device 32 is mounted on the press at some convenient location as, for example, on the side thereof or on the front of the press upright or on a control panel adjacent the press. This device is in the nature of a counter for counting revolutions of the output shaft of motor 30 or the number of revolutions of gear or driver 28 or of nut 26 and is connected with any one of the foregoing elements by a drive diagrammatically illustrated at 34. This may be a speed reducing drive if necessary as will be evident hereinafter.

The purpose of the indicator is to indicate the actual position of the slide with respect to its shut-height on the maximum daylight opening of the press or the position of the slide relative to some other fixed reference point in the press. At this end the indicator 32, which is shown in perspective in FIGURE 2 and in section in FIGURE 3, comprises a plurality of indicator dials 36 which are arranged in the form of a conventional counter mechanism which counter mechanism includes an input member 38 which may have a worm or a skew gear mounted thereon and which in turn drives a gear 40 that is connected with indicator dial 36a at the extreme right-hand of the indicator.

Indicator dial 36a indicates the smallest unit of measurement, for example, thousandths of an inch. This dial is graduated from zero to nine and is connected by the gearing 43 with the next indicator dial 36b which is also graduated from zero to nine and which will indicate hundredths of an inch. Each of the driven indicator dial is thus connected with the one adjacent thereto in the conventional manner of indicators or counters of this nature so that an indication will be given which will read in inches to the nearest thousandths of an inch.

It is not believed necessary to explain in detail the manner of interconnecting the dials because this is well known in the counter art.

It will be evident, however, that dial 36a is connected with dial 36b so that at the end of each complete revolution of dial 36a dial 36b will be indexed one tenth of a revolution. Dial 36b is similarly connected with the next dial 36c and this is in turn connected with dial 36d to the left thereof and, finally, dial 36d is connected in the same manner with the final dial indicated at 36e.

The aforementioned dials 36a through 36e which are driven in the aforementioned conventional manner for counters are visible through the side glass of window 42 arranged in the front of the indicator device where the indicia on the dials can readily be observed by the press operator or the set up man.

According to the present invention the indicator device of the present invention comprises another complete set of dials which, however, are independent of the dials 36 and are manually adjustable. This additional set of dials are generally indicated at 37 and individually numbered 37a, 37b, 37c, 37d, and 37e and correspond in accordance with their suffixes to the dials 36 bearing the same suffix.

The last mentioned dials 37, however, are preferably not visible through the side glass or window 42 but, instead, project through and are visible through window 44 provided in the top of the indicator device as will be seen in FIGURES 2 and 3. The dials 37 are arranged for being manually adjusted into any desired position completely independent of the dials 36 and are employed for the purpose of presetting the position to which slide 12 will be moved upon energization of slide adjusting motor 30.

In order to retain dials 37 in their adjusted positions detent means are provided. This may take the form, for example, of notch means 46 provided in the peripheral portions of dials 37 and yieldably engaged by resilient detent 48. Dials 37 can easily be snapped from place to place with an arrangement of this nature and will be held in their adjusted positions.

According to the present invention an electrical control system is provided which is under the control of the positions of dials 36 and 37 relative to each other. In which, a control system is provided in association of adjusting motor 30 which, once dials 37 have been adjusted to indicate a slide position which can be read through window 44, will control the energization of motor 30 until the indication by dials 36 which can be read through window means 42 corresponds to the aforementioned indication of dials 37.

This is accomplished, in brief, by arranging cooperating contact elements on dials 36 and 37 which will permit energization of motor 30 when the indications of the dials differ from each other and which will interrupt energization of motor 30 when the slide has been adjusted to the point that the indications of the respective dials coincide with each other.

Preferably, the control system includes an arrangement whereby motor 30 will slow down as the slide approaches the pre-selected position thereof so the slide will not tend to over shoot the said preselected position.

The aforementioned contact element arrangement will be seen somewhat schematically illustrated in FIGURES 3, 4, and 6 through 9 and the electrical control circuit to which the contact elements pertain is illustrated in FIGURE 10.

Turning first to FIGURE 4 each dial 37 carries contact element means 50 which are located at some particular point about the respective dial and which contact element means comprise a wiping type contact on each side of the respective dial and with the individual contacts being electrically interconnected.

In FIGURE 4 a contact will be seen to be a resilient metallic member mounted in dial 37 which is of electrical insulating material but it will be understood that the dial could be metal so long as the contact element means were properly insulated therefrom. Also, brush type contacts of any sort could be employed.

The contact element on the right side of dial 37 engages a continuous conductive ring 52 mounted on the left side of the adjacent dial 36 and preferably electrically insulated from the pertaining dial 36.

The dial 36 on the left hand side of dial 37, on the other hand, has, instead of a continuous conductive ring, a contact element 54 which will engage the pertaining contact element 50 on dial 37 in only one position of relative rotation of the two dials. This particular position will be that position wherein the indication of dial 37 through window 44 is the same as the indication of the aforementioned left hand dial 36 through window 42.

The left hand dial 36 also has a conductive ring 52 thereon the same as the ring 52 described in connection with the right hand dial 36. Each ring 52 is electrically connected through its pertaining dial 36 by connector 56 with the contact element 54 pertaining to the same said dial 36.

Each of the dials 36 is constructed in the same manner with a conductive ring on the left side electrically interconnected with a single contact element on the right side. Each of the conductive rings 52 is engaged by a contact element 50 of a dial 37 except for the ring 52 pertaining to the extreme left hand dial 37e and in which case the ring 52 is engaged by a stationary wiper type contact element 58 carried by the case 60 of the indicator device.

Case 60 may be of insulating material or contact element 58 may be insulatingly carried thereby. Contact element 58 has available a terminal 62 externally of the indicator device for connection of the device in the control circuit of FIGURE 10.

Each of the manually adjustable dials 37 is constructed in the same manner with the contact element means 50 on the left side arranged for engagement with the contact element 54 of the next adjacent dial 36 and with the contact element means 50 on the right side engaging the conductive ring 52 of the next adjacent dial 36 with the exception of the extreme right hand dial 37a.

This dial has the contact element means 50 on the left side thereof electrically connected with a conductive ring 64 insulatingly mounted on the right hand side of dial 37 and in engagement with a wiper type contact element 66 carried by casing 60 and electrically connected with terminal means 68 available from externally of the casing of the device.

At this point it will be apparent that a complete circuit through the device leading from terminal 62 to terminal 68 will only be had when all of the dials 36 correspond in position to their respective dials 37 so that the numerical indication through window 42 is exactly the same as the numerical indication through window 44. Since dials 36 are driven in unison with slide 12 and given actual correct indication of the position of slide 12, it follows that the aforementioned circuit through the indicator will only be established when the position of the slide corresponds to the position thereof that has been pre-selected by dials 37.

It is desirable to detect a position in advance of the final position of the slide so that the slide adjusting motor can be slowed down for the final portion of its movement.

Different ways present themselves of accomplishing this but one of the preferred ways is shown in FIGURES 8 and 9. In these figures it will be seen that the dial 36b corresponding to hundredths of an inch has its contact element 54 connected to additional contact elements 54a and 54b each being spaced from contact element 54 thirty-six degrees or some multiple thereof. These additional contact elements are electrically connected with contact element 54.

On the adjacent dial 37b, in addition to the contact element 50, there is provided two more contact elements 50a and 50b which are circumferentially spaced from contact element 50 by thirty-six degrees or some multiple thereof. The two contact elements 50a and 50b are connected to ring 70 insulatingly carried by dial 37b and continuously engaged by spring contact elements 72 carried by case 60 and electrically connected as an external terminal 74.

By the described arrangement a circuit will be completed from terminal 62 to terminal 74 when dials 36 indicate a position of the slide that is a certain number of thousandths of an inch away from the final position thereof. It will be apparent that this additional circuit can be completed in any manner and with the slide any predetermined distance from its final position.

Thus, this detection could be made a few thousandths, a few hundredths, or a larger fraction of an inch, or any other distance away from the final position of the slide.

The indicator 32 which has just been described is connected in a control circuit an example of which is illustrated in FIGURE 10.

In FIGURE 10 the power lines are indicated in L1 and L2. Connected therebetween is the coil of relay RU which, when energized, will close a circuit to slide adjusting motor 30 to cause it to run in a direction to move the slide upwardly.

The coil of relay RU in series with a normally open push button 90 and a holding circuit for the said coil is established through blade RU1 of the relay. This holding circuit passes through a normally closed blade 92 of an auxiliary relay R4 and also through a limit switch LS1 which is normally closed on its contact 94 and which is actuated by the slide when it reaches its upper adjusted position to open from contact 94 and close on a second contact 96.

A second blade RU2 of relay RU completes the aforementioned energizing circuit to motor 30.

A second relay RD is operable when energized to cause motor 30 to run in a direction to move the slide downwardly. The coil of this relay is in circuit with a normally open push button 98 and there is a blade RD1 that establishes a holding circuit for the coil of relay RD. This holding circuit includes normally closed blade 100 of auxiliary relay 94 and the blade of a limit switch LS2 which blade is normally closed on contact 102. Limit switch LS2 is actuated by the slide in its lower most position and when actuated the blade of the switch leaves contact 102 and closes on contact 104.

A second blade RD2 of relay RD completes the circuit to motor 30.

Relay RU has a third blade RU3 that is normally closed which is in circuit with the coil of relay RD and relay RD has a third blade RD3 which is normally closed and which is in circuit with the coil of relay RU whereby only one of the relays at a time can be energized.

Contact 96 of limit switch LS1 is connected by wire 106 with the side of push button 98 opposite power line L1 while contact 104 of limit switch LS2 is connected at the side of push button 90 opposite power line L1. By this arrangement of the limit switches, when either of relays RU or RD are energized the slide can move to the limit of its movement in the direction pertaining to the energized relay and when this limit is reached the pertaining relay will be deenergized and the other relay will be energized and the slide will commence to move in the opposite direction.

The movement of the slide according to this invention is controlled by connecting the indicator 32 in the circuit as is illustrated in FIGURE 10. In FIGURE 10 terminal 62 of indicator 32 is connected with power line L1.

Terminal 68 of indicator 32 is connected with one side of the actuating coil of relay R4, the other side of this coil being connected with power line L2.

Relay R4 controls the aforementioned normally closed blades 92 and 100 located in the holding circuit for the coils of relays RU and RD respectively. Relay R4 will be energized when the dials 36 have reached the position where the indication given thereby is the same as the pre-set indication of dials 37.

In order to prevent the slide from over shooting the pre-set position, terminal 74 of counter 32 is connected with one side of the actuating coil of relay R5 the other side of which is connected with power line L2. This relay will thus be energized when the counter indicates the slide having reached a position a predetermined distance from the pre-selected position. Relay R5 has a holding circuit including a blade 110 under the control of relay R5 and located in this circuit is another normally closed blade 112 of relay R4.

The principal blade controlled by relay R5 is a normally closed blade 114 arranged in series with motor 30 and by-passing a resistance R. When blade 114 is open motor 30 will slow down and the slide will thus approach its pre-selected position at reduced speed.

In operation, the press operator or the set-up man will pre-select the new slide position by adjusting dials 37 through the window 44 and will then depresss one of push buttons 90 or 98 depending on whether the slide should be moved upwardly or downwardly. Motor 30 will then run and cause movement of the slide at a speed of about two inches a minute toward its new position and when the slide approaches its new position, it will slow down and then come to a halt when the indication of dials 36 through window 42 matches the pre-set indication of dials 37 through window 44.

If, as previously mentioned, the slide is to move in one direction and the push button pertaining to the opposite direction is inadvertently depressed, the same operative cycle will obtain except that the slide will move to its limit of travel in one direction and will then automatically reverse and will then move to its pre-selected position and come to a halt.

The device according to the present invention is relatively simple and inexpensive and eliminates the necessity for elaborate digital device such as have been used heretofor for this purpose. For relatively little cost the advantages of automatic slide adjustment to pre-selected position can be had.

While the invention has been particularly disclosed in connection with pre-selecting the position of the slide of a mechanical press, it will be evident that other adjustable machine elements and the like could be controlled by the pre-settable counter mechanism according to the present invention.

It will be understood that this invention is susceptible to modification in orderr to adapt it to different usages and conditions; and accordingly, it is desired to comprehend such modifications within this invention as may fall within the scope of the appended claims.

I claim:
1. In a press having a slide connected by an adjustable length connecting rod to a crankshaft whereby the adjustment of the connecting rod determines the shut height of the slide;
   motor driven adjusting means connected to the connecting rod to adjust the length thereof,
   an indicator connected to the motor and driven thereby to indicate the shut height of the slide,
   said indicator having a plurality of drivingly interconnected graduated first dials,
   presettable means associated with the indicator for presetting a desired shut height of the slide,
   said presettable means comprising a plurality of manually adjustable graduated second dials respectively adjacent said first dials,
   control circuit means associated with said energizing circuit means including a first relay energizable for causing the motor to slow down and a second relay energizable for interrupting said energizing circuit means to halt the motor,
   and cooperating contact elements carried by said dials operable to complete a circuit to said first relay when said first dials reach a position a predetermined amount away from the setting of said second dials,
   and also operable when said first dials reach a position corresponding to the setting of said second dials to complete a circuit to said second relay.

2. In a press; a crankshaft, a slide, a connecting rod connecting the crankshaft with the slide and adjustable in effective length, a motor operatively connected to the connecting rod and reversibly energizable for changing the effective length thereof,
   an energizing circuit for the motor, means for closing the energizing circuit,
   means for automatically reversing said motor at predetermined limits of adjustment of the slide,
   first means connected to the motor to be driven thereby so as to occupy a position corresponding to the adjusted position of the slide,
   second means manually presettable for indicating a desired slide position and adjacent said first means,
   contact elements on said first and second means engageable only when the position of said first means corresponds to the preset position of said second means,
   and a control circuit including said contact elements operable upon engagement of said contact elements to interrupt said energizing circuit to halt said motor,
   said first and second means comprising first and second graduated dials, respectively,
   a casing enclosing said dials,
   a first window in the casing for observing said first dials,
   and a second window in the casing for observing said second dials.

3. In a press; a crankshaft, a slide, a connecting rod connecting the crankshaft with the slide and adjustable in effective length, a motor operatively connected to the connecting rod and reversibly energizable for changing the effective length thereof,
   an energizing circuit for the motor, means for closing the energizing circuit,
   means for automatically reversing said motor at predetermined limits of adjustment of the slide,
   first means connected to the motor to be driven thereby so as to occupy a position corresponding to the adjusted position of the slide,
   second means manually presettable for indicating a desired slide position and adjacent said first means,
   first contact elements on said first and second means engageable when said first means approaches the preset position of said second means,
   second contact elements on said first and second means engageable only when the position of said first means corresponds to the preset position of said second means,
   and control circuit means including said contact elements and operable upon engagement of said first contact elements to slow down said motor and upon engagement of said second contact elements to halt said motor.

References Cited by the Examiner
UNITED STATES PATENTS

| | | | |
|---|---|---|---|
| 1,869,999 | 8/1932 | Cary | 235—132 |
| 2,520,749 | 8/1950 | Ware et al. | 318—33 |
| 2,673,686 | 3/1954 | Hoffman | 235—132 |
| 2,686,894 | 8/1954 | Mathieu | 318—467 X |
| 2,720,619 | 10/1955 | James | 318—33 X |
| 2,858,958 | 11/1958 | Blazer | 235—132 |
| 2,889,507 | 6/1959 | Kennedy et al. | 318—29 |
| 2,984,175 | 5/1961 | Wahl | 100—257 |
| 2,991,403 | 7/1961 | Groft | 318—467 X |
| 3,028,531 | 4/1962 | Heiberger et al. | 318—29 |
| 3,147,695 | 9/1964 | Hyman | 100—257 |

ORIS L. RADER, *Primary Examiner.*

LEO SMILOW, MILTON O. HIRSHFIELD, *Examiners.*

J. C. BERENZWEIG, *Assistant Examiner.*